(12) United States Patent
Lyons et al.

(10) Patent No.: US 10,060,631 B2
(45) Date of Patent: Aug. 28, 2018

(54) HYBRID DIFFUSER CASE FOR A GAS TURBINE ENGINE COMBUSTOR

(71) Applicant: United Technologies Corporation, Hartford, CT (US)

(72) Inventors: Christopher B. Lyons, West Hartford, CT (US); Alexander W. Williams, Windsor Locks, CT (US); Alexander Broulidakis, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 160 days.

(21) Appl. No.: 14/911,158

(22) PCT Filed: Aug. 29, 2014

(86) PCT No.: PCT/US2014/053481
§ 371 (c)(1),
(2) Date: Feb. 9, 2016

(87) PCT Pub. No.: WO2015/031796
PCT Pub. Date: Mar. 5, 2015

(65) Prior Publication Data
US 2016/0195275 A1    Jul. 7, 2016

Related U.S. Application Data

(60) Provisional application No. 61/871,645, filed on Aug. 29, 2013.

(51) Int. Cl.
| | | |
|---|---|---|
| *F23R 3/00* | (2006.01) | |
| *F23R 3/60* | (2006.01) | |
| *F02C 3/14* | (2006.01) | |
| *F01D 25/16* | (2006.01) | |
| *F01D 25/24* | (2006.01) | |
| *F01D 9/04* | (2006.01) | |
| *F02C 7/20* | (2006.01) | |

(Continued)

(52) U.S. Cl.
CPC ............... *F23R 3/60* (2013.01); *F01D 9/041* (2013.01); *F01D 25/162* (2013.01); *F01D 25/24* (2013.01); *F01D 25/243* (2013.01); *F02C 3/14* (2013.01); *F02C 7/20* (2013.01); *F23R 3/04* (2013.01); *F04D 29/54* (2013.01); *F04D 29/542* (2013.01); *Y02T 50/671* (2013.01); *Y02T 50/675* (2013.01)

(58) Field of Classification Search
CPC .... F23R 3/60; F23R 3/04; F01D 9/041; F01D 25/24; F01D 25/243; F04D 29/54; F04D 29/542

See application file for complete search history.

(56) References Cited

U.S. PATENT DOCUMENTS 4,264,272 A     4/1981  Weiler
4,483,149 A  *  11/1984  Rider ..................... F01D 25/16
                                                    60/751

(Continued)

*Primary Examiner* — Pascal M Bui Pho
*Assistant Examiner* — Katheryn Malatek
(74) *Attorney, Agent, or Firm* — O'Shea Getz P.C.

(57) ABSTRACT

A hybrid diffuser case for a gas turbine engine includes an outer diffuser case wall that extends downstream from an annular outer pre-diffuser case shroud. An inner diffuser case wall extends downstream from an annular inner pre-diffuser case shroud. A multiple of struts extend between the annular outer pre-diffuser case shroud and the annular inner pre-diffuser case shroud.

13 Claims, 6 Drawing Sheets

(51) Int. Cl.
*F23R 3/04* (2006.01)
*F04D 29/54* (2006.01)

(56) References Cited

U.S. PATENT DOCUMENTS

| | | | |
|---|---|---|---|
| 4,870,826 | A | 10/1989 | Daguet et al. |
| 5,212,940 | A * | 5/1993 | Glover .................. F01D 11/20 |
| | | | 415/115 |
| 5,406,799 | A | 4/1995 | Marshall |
| 5,490,380 | A | 2/1996 | Marshall |
| 7,062,918 | B2 | 6/2006 | Walker et al. |
| 7,080,516 | B2 | 7/2006 | Pidcock et al. |
| 7,181,914 | B2 | 2/2007 | Pidcock et al. |
| 7,854,125 | B2 | 12/2010 | Eadon et al. |
| 7,895,840 | B2 | 3/2011 | Haller |
| 8,082,738 | B2 | 12/2011 | Cornelius et al. |
| 8,162,605 | B2 | 4/2012 | Alvanos et al. |
| 8,438,854 | B2 | 5/2013 | Nolcheff |
| 2002/0092303 | A1 | 7/2002 | Al-Roub et al. |
| 2003/0010014 | A1 | 1/2003 | Bland et al. |
| 2004/0093871 | A1 | 5/2004 | Burrus et al. |
| 2004/0231333 | A1 | 11/2004 | Tiemann |
| 2009/0151360 | A1 | 6/2009 | Burd et al. |

* cited by examiner

HYBRID DIFFUSER CASE FOR A GAS TURBINE ENGINE COMBUSTOR

CROSS-REFERENCE TO RELATED APPLICATION

This application claims priority to PCT Patent Application No. PCT/US2014/053481 filed Aug. 29, 2014, which claims priority to U.S. Patent Appln. Ser. No. 61/871,645 filed Aug. 29, 2013, each of which is hereby incorporated herein by reference in its entirety.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section typically includes an outer shell lined with heat shields to form a combustion chamber. The combustion chamber is surrounded by a diffuser case formed of an inner case and an outer case, where the inner case defines a pre-diffuser and the outer case serves as structural containment. Together the cases form the flowpath and necessary volume to mitigate unrecoverable compressor surge. Although effective, the diffuser case may be relatively heavy in weight.

SUMMARY

A hybrid diffuser case for a gas turbine engine, according to one disclosed non-limiting embodiment of the present disclosure, includes an outer diffuser case wall, an inner diffuser case wall and a multiple of struts. The outer diffuser case wall extends downstream from an annular outer pre-diffuser case shroud. The inner diffuser case wall extends downstream from an annular inner pre-diffuser case shroud. The struts extend between the annular outer pre-diffuser case shroud and the annular inner pre-diffuser case shroud.

In a further embodiment of the present disclosure, an outer arcuate interface wall is included between the outer diffuser case wall and the annular outer pre-diffuser case shroud.

In a further embodiment of any of the foregoing embodiments of the present disclosure, a compressor case interface is included that extends from the annular outer pre-diffuser case shroud.

In a further embodiment of any of the foregoing embodiments of the present disclosure, the compressor case interface terminates with a fastener flange that extends radially therefrom. The fastener flange extends around and is perpendicular to a central longitudinal engine axis.

In a further embodiment of any of the foregoing embodiments of the present disclosure, a plurality of stiffeners are included that extend between the fastener flange and the outer diffuser case wall.

In a further embodiment of any of the foregoing embodiments of the present disclosure, an arcuate interface wall is included between the inner diffuser case skirt and the annular inner pre-diffuser case shroud.

In a further embodiment of any of the foregoing embodiments of the present disclosure, a bearing support is included that extends from the inner diffuser case.

In a further embodiment of any of the foregoing embodiments of the present disclosure, the bearing support terminates with a fastener flange that extends radially therefrom. The fastener flange extends around and is perpendicular to a central longitudinal engine axis.

In a further embodiment of any of the foregoing embodiments of the present disclosure, the bearing support and the compressor case interface are located along a common axis.

In a further embodiment of any of the foregoing embodiments of the present disclosure, an inboard interface wall is included that extends from the annular inner pre-diffuser case shroud.

In a further embodiment of any of the foregoing embodiments of the present disclosure, the inboard interface wall terminates with a fastener flange that extends radially therefrom. The fastener flange extends around and is perpendicular to a central longitudinal engine axis.

A hybrid diffuser case for a gas turbine engine, according to another disclosed non-limiting embodiment of the present disclosure, includes an outer diffuser case wall, an inner diffuser case wall, a multiple of struts, a compressor case interface and a bearing support. The outer diffuser case wall extends downstream from an annular outer pre-diffuser case shroud. The inner diffuser case wall that extends downstream from an annular inner pre-diffuser case shroud. The struts extend between the annular outer pre-diffuser case shroud and the annular inner pre-diffuser case shroud. The compressor case interface extends from the annular outer pre-diffuser case shroud. The bearing support extends from the inner diffuser case.

In a further embodiment of any of the foregoing embodiments of the present disclosure, an inner diffuser case skirt is included between the inner diffuser case wall and the annular inner pre-diffuser case shroud. The bearing support extends from the inner diffuser case skirt.

In a further embodiment of any of the foregoing embodiments of the present disclosure, the bearing support terminates with a fastener flange that extends radially therefrom. The fastener flange extends around and is perpendicular to a central longitudinal engine axis.

In a further embodiment of any of the foregoing embodiments of the present disclosure, the bearing support and the compressor case interface are located along a common axis.

In a further embodiment of any of the foregoing embodiments of the present disclosure, an outer arcuate interface wall is included between the outer diffuser case wall and the annular outer pre-diffuser case shroud. The compressor case interface extends from the annular outer pre-diffuser case shroud.

In a further embodiment of any of the foregoing embodiments of the present disclosure, the compressor case interface terminates with a fastener flange that extends radially therefrom. The fastener flange extends around and is perpendicular to a central longitudinal engine axis.

In a further embodiment of any of the foregoing embodiments of the present disclosure, a multiple of stiffeners are included that extend between the fastener flange and the outer diffuser case wall.

A combustor section for a gas turbine engine, according to another disclosed non-limiting embodiment of the present disclosure, includes an outer diffuser case wall, an outer combustor wall assembly, an inner diffuser case wall, an inner combustor wall assembly, a multiple of struts, a compressor case interface and a bearing support. The outer diffuser case wall extends downstream from an annular outer pre-diffuser case shroud. The outer combustor wall assembly is spaced from the outer diffuser case wall to define an outer annular plenum. The inner diffuser case wall extends downstream from an annular inner pre-diffuser case shroud. The inner combustor wall assembly is spaced from the inner diffuser case wall to define an inner annular plenum, where the inner combustor wall assembly and the outer combustor wall assembly define an annular combustion chamber therebetween. The struts extend between the annular outer pre-diffuser case shroud and the annular inner pre-diffuser case shroud. The compressor case interface extends from the annular outer pre-diffuser case shroud. The bearing support extends from the inner diffuser case.

In a further embodiment of any of the foregoing embodiments of the present disclosure, a cowl is included and mounted to the outer combustor wall assembly and the inner combustor wall assembly. An inner diffuser case skirt is included between the inner diffuser case wall and the annular inner pre-diffuser case shroud, where the inner diffuser case skirt generally follows a profile of the cowl. An outer arcuate interface wall is included between the outer diffuser case wall and the annular outer pre-diffuser case shroud, where the outer arcuate interface wall generally follows a profile of the cowl.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
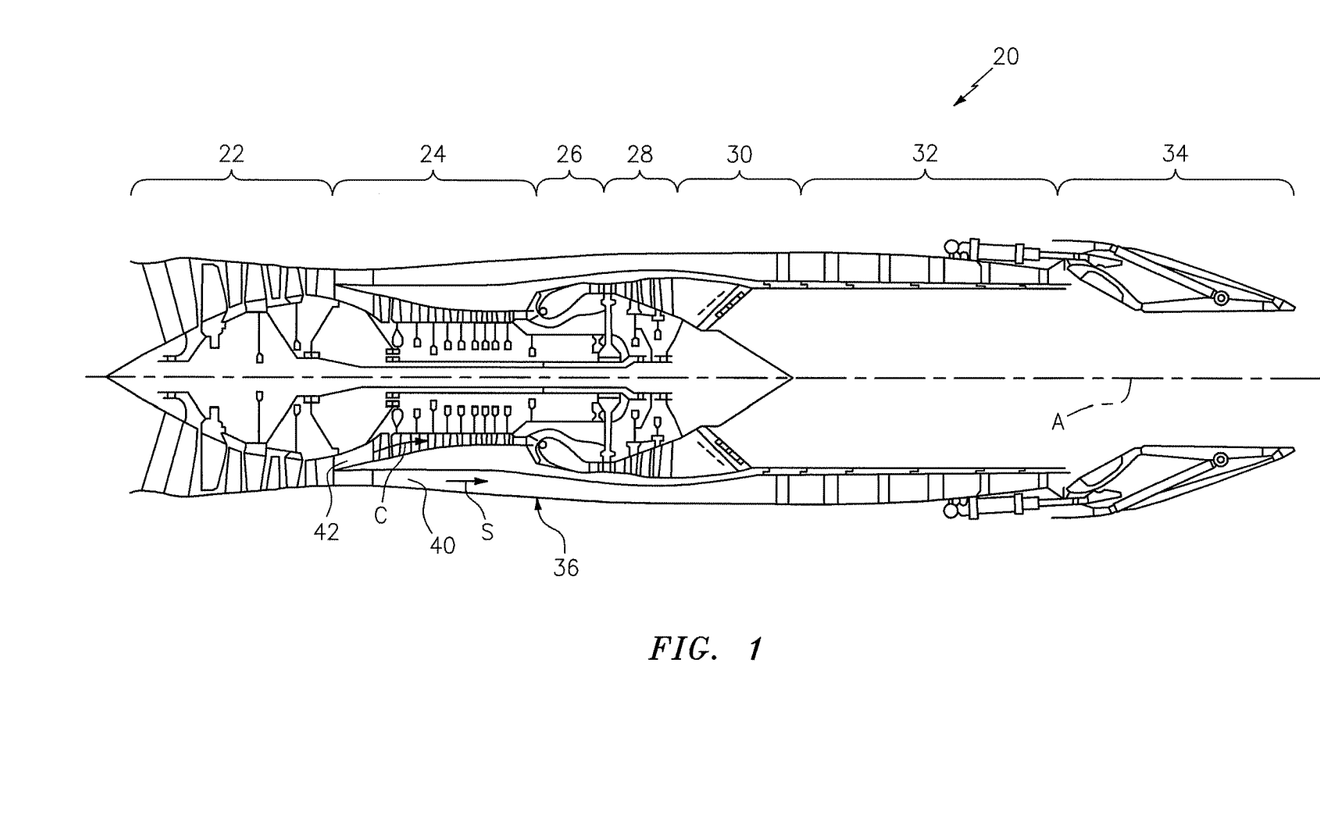
FIG. 1 is a schematic cross-section of an example gas turbine engine architecture.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. Various case structures and modules may define the engine case structure 36 which essentially defines an exoskeleton to support the rotational hardware.

Air that enters the fan section 22 is divided between a core airflow C through the core airflow path 42 and a secondary airflow S through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow S may be utilized for a multiple of purposes to include, for example, cooling and pressurization. The secondary airflow S as defined herein may be any airflow different from the core airflow. The secondary airflow S may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 terminates with the nozzle system 34 such as a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
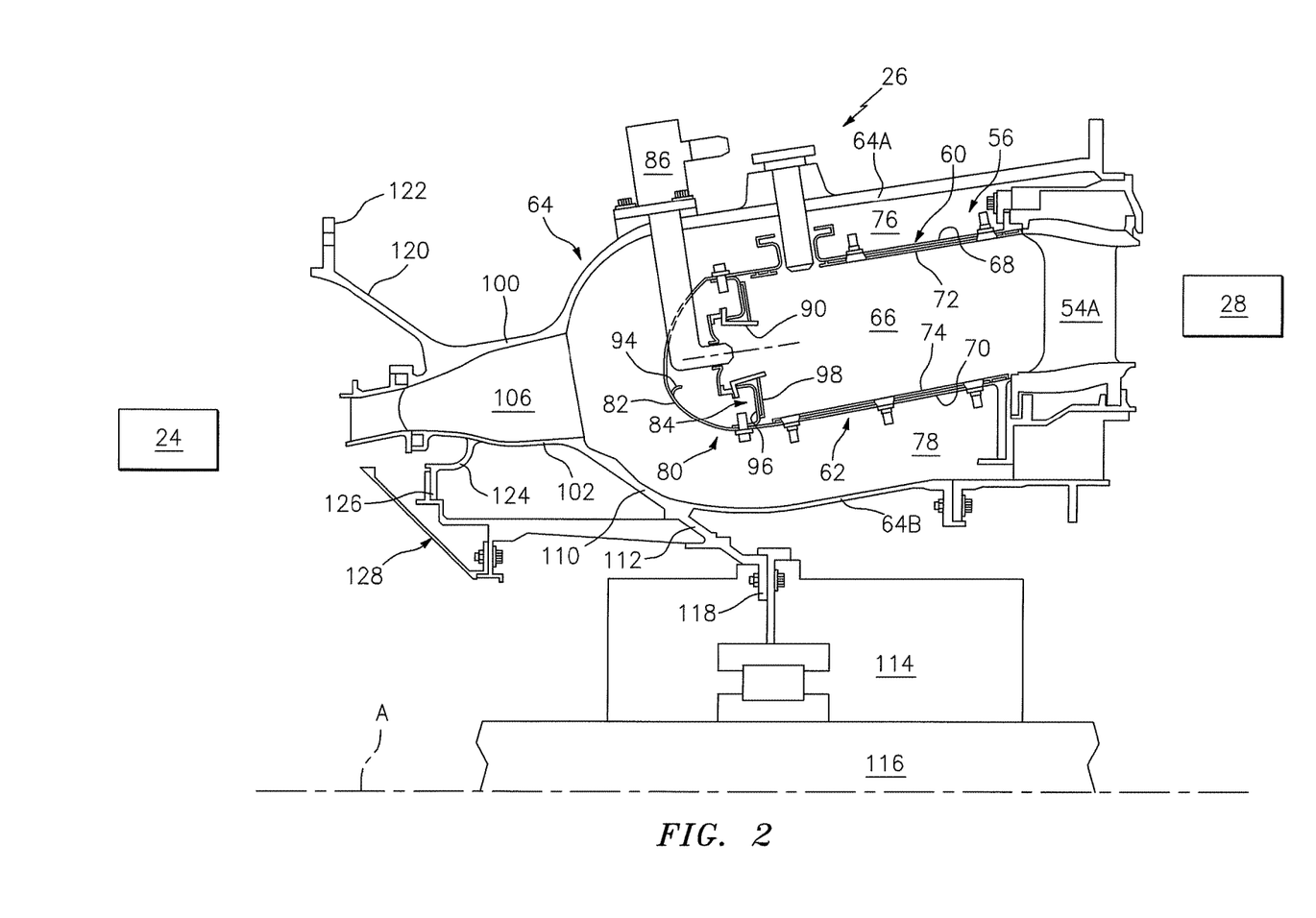
FIG. 2 is an longitudinal schematic sectional view of a combustor section according to one non-limiting embodiment.

With reference to FIG. 2, the combustor section 26 generally includes a combustor 56 with an outer combustor wall assembly 60, an inner combustor wall assembly 62 and a hybrid diffuser case 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor wall assembly 60 is spaced radially inward from an outer diffuser case wall 64A of the hybrid diffuser case 64 to define an outer annular plenum 76. The inner combustor liner assembly 62 is spaced radially outward from an inner diffuser case wall 64B of the hybrid diffuser case 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28 (illustrated schematically). Each combustor wall assembly 60, 62 generally includes a respective support shell 68, 70 which supports one or more liner panels 72, 74 mounted thereto that are arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material.

The combustor 56 further includes a forward assembly 80 immediately downstream of the compressor section 24 (illustrated schematically) to receive compressed airflow therefrom. The forward assembly 80 generally includes a cowl 82, a bulkhead assembly 84, and a multiple of swirlers 90 (one shown). It should be appreciated that various structures and geometries may alternatively or additionally be provided.

The bulkhead assembly 84 generally includes a bulkhead support shell 96 secured to the combustor wall assemblies 60, 62, and a multiple of circumferentially distributed bulkhead liner panels 98 secured to the bulkhead support shell 96. The bulkhead support shell 96 is generally annular and the multiple of circumferentially distributed bulkhead liner panels 98 are segmented, typically one to each fuel nozzle 86.

The cowl 82 extends radially between, and is secured to, the forwardmost ends of the combustor walls assemblies 60, 62. The cowl 82 includes a multiple of circumferentially distributed hood ports 94 that receive one of a respective multiple of fuel nozzles 86 to facilitate the direction of compressed air into the combustion chamber 66 through the swirler 90. Each fuel nozzle 86 may be secured to the hybrid diffuser case 64 and project through one of the hood ports 94 and into the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted adjacent a first row of Nozzle Guide Vanes (NGVs) 54A. The NGVs 54A are static engine components which direct core airflow combustion gases onto the turbine blades of a high pressure turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades utilize this energy to drive the turbine rotor.

Figure 3:
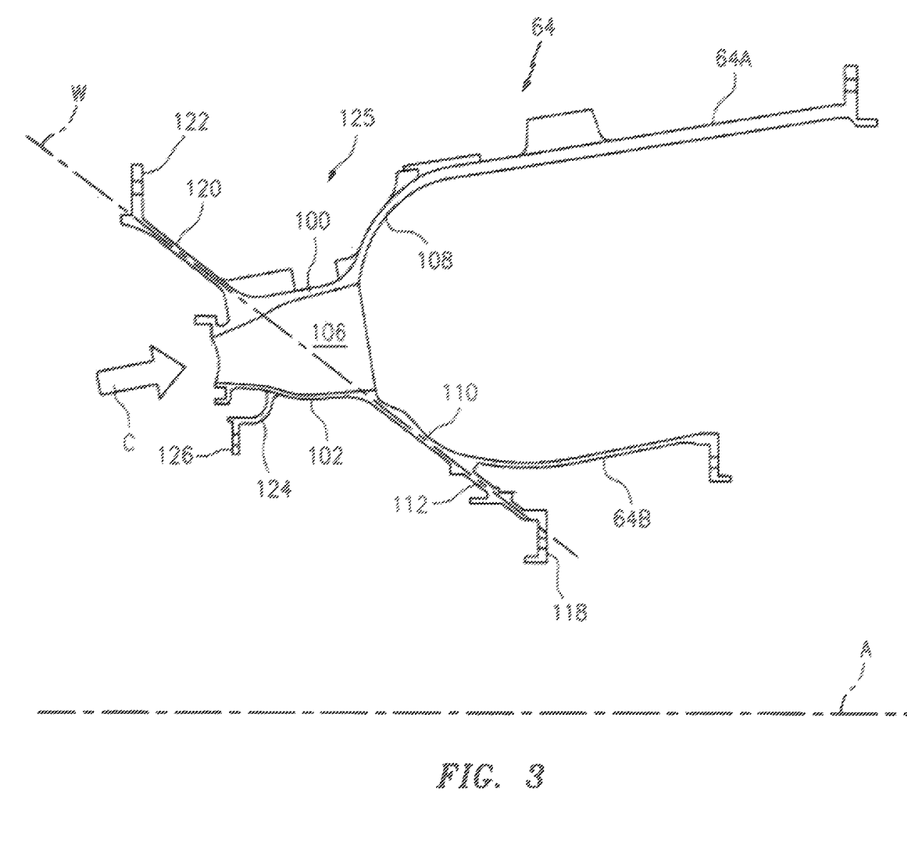
FIG. 3 is an longitudinal schematic sectional view of a hybrid diffuser case in the combustor section of FIG. 2.
Figure 4:
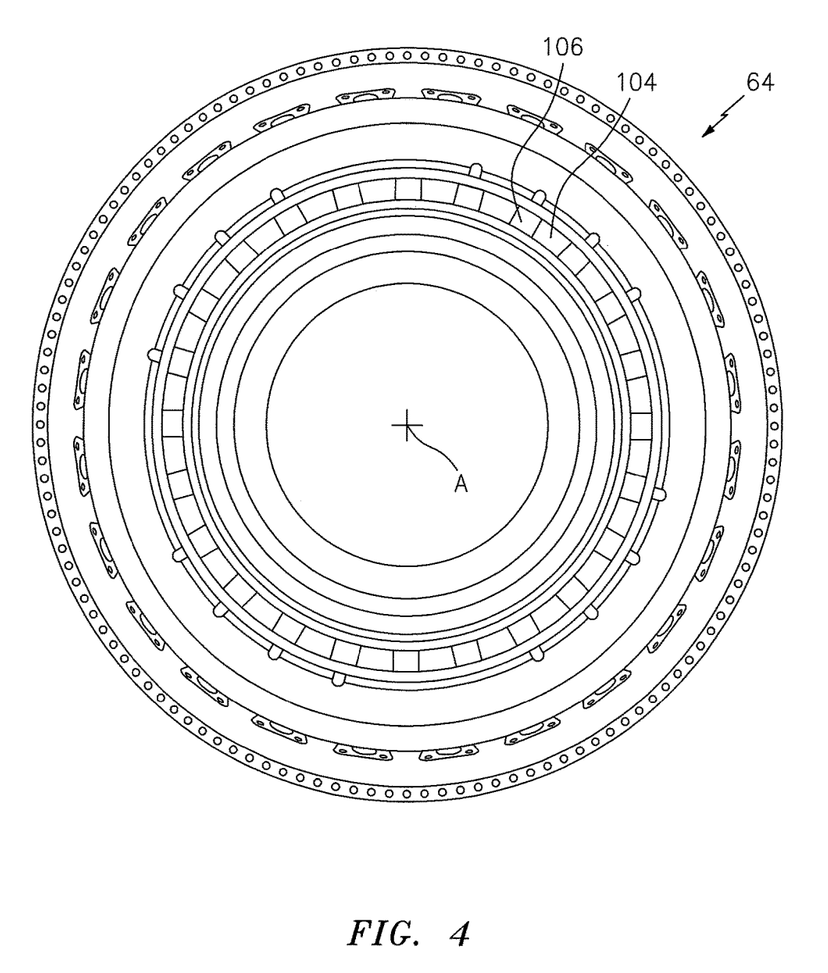
FIG. 4 is a schematic forward-looking-aft view of the hybrid diffuser case.

With reference to FIG. 3, the outer diffuser case wall 64A and the inner diffuser case wall 64B extend downstream from an annular outer pre-diffuser case shroud 100 and an annular inner pre-diffuser case shroud 102, respectively. A multiple of struts 106 extend in a radial direction between the annular outer pre-diffuser case shroud 100 and the annular inner pre-diffuser case shroud 102 to from an integral hybrid diffuser case 64 (also shown in FIG. 4).

The annular outer pre-diffuser case shroud 100, the annular inner pre-diffuser case shroud 102 and the multiple of struts 106 define an annular flow path 104 (see FIG. 4) for compressed airflow C from the upstream compressor section 24 to form the necessary volume to mitigate unrecoverable compressor surge. The struts 106 are defined by an outer airfoil wall surface between an inner and outer flowpath shrouds. The struts 106 may also serve a secondary function to pass through both fluid and service lines. It should be appreciated that various profiles of the hybrid diffuser case 64 may alternatively be provided.

The outer diffuser case wall 64A and the respective annular outer pre-diffuser case shroud 100 include an outer arcuate interface wall 108 therebetween. The outer arcuate interface wall 108 generally follows the profile of the cowl 82. That is, the outer arcuate interface wall 108 is spaced away from the cowl 82 but generally follows the contours thereof to facilitate airflow into the outer annular plenum 76 (see FIG. 2).

The inner diffuser case wall 64B and the respective annular inner pre-diffuser case shroud 102 include an inner diffuser case skirt 110 therebetween. The arcuate interface wall 108 also generally follows the profile of the cowl 82. That is, the inner diffuser case skirt 110 is spaced away from the cowl 82 but generally follows the contours thereof to facilitate airflow into the inner annular plenum 78 (see FIG. 2).

The inner diffuser case skirt 110 also includes a bearing support 112. The bearing support 112 extends radially inward to a bearing compartment 114 (illustrated schematically in FIG. 2) that at least partially supports a rotor shaft 116 (illustrated schematically in FIG. 2) which passes through the combustor section 26. The bearing support 112 terminates with a fastener flange 118 that extends radially therefrom. The fastener flange 118 extends around and is perpendicular to the central longitudinal engine axis A.

Opposite the bearing support 112, a compressor case interface 120 extends from the annular outer pre-diffuser case shroud 100. The compressor case interface 120 extends generally forward from the annular outer pre-diffuser case shroud 100 to mount the hybrid diffuser case 64 to the compressor section 24 (see FIG. 2). The compressor case interface 120 terminates with a fastener flange 122 that extends radially therefrom. The fastener flange 122 extends around and is perpendicular to the central longitudinal engine axis A. The respective multiple of fuel nozzles 86 are mounted to the outer diffuser case wall 64A axially downstream of the fastener flange 122 (see FIG. 2).

The compressor case interface 120 is thereby axially displaced and spaced from the outer arcuate interface wall 108 and the outer diffuser case wall 64A. That is, the compressor case interface 120, the annular outer pre-diffuser case shroud 100 and the compressor case interface 120 define an annular radial inward profile 125 which forms a reduced diameter around the central longitudinal engine axis A.

In one disclosed non-limiting embodiment, the compressor case interface 120 is located generally along an axis W defined by the bearing support 112. The relative position of the compressor case interface 120 and the bearing support 112 facilitates stiffness control of the hybrid diffuser case 64. In this disclosed non-limiting embodiment, the generally in-line arrangement of the compressor case interface 120 and the bearing support 112 along an axis W. In this disclosed non-limiting embodiment, the axis W represents a near ideal case from a stiffness perspective.

Radially inboard of the compressor case interface 120, an inboard interface wall 124 extends from the annular inner pre-diffuser case shroud 102. The inboard interface wall 124 terminates with a fastener flange 126 that extends radially therefrom to interface with inboard static structure 128 (illustrated schematically in FIG. 2). The fastener flange 122 extends around, is perpendicular to the central longitudinal engine axis A and, in the disclosed non-limiting embodiment, is axially aft of the fastener flange 122.

This annular radial inward profile 125 eliminates about fifteen percent (15%) of a conventional diffuser case that thereby reduces case weight by an equivalent amount. That is, the combination of the pre-diffuser structure and outer case facilities a lighter weight structure. Overall backbone stiffness is reduced compared to conventional design but may be readily controlled by the arrangement of the compressor case interface 120 and the bearing support 112

Figure 5:
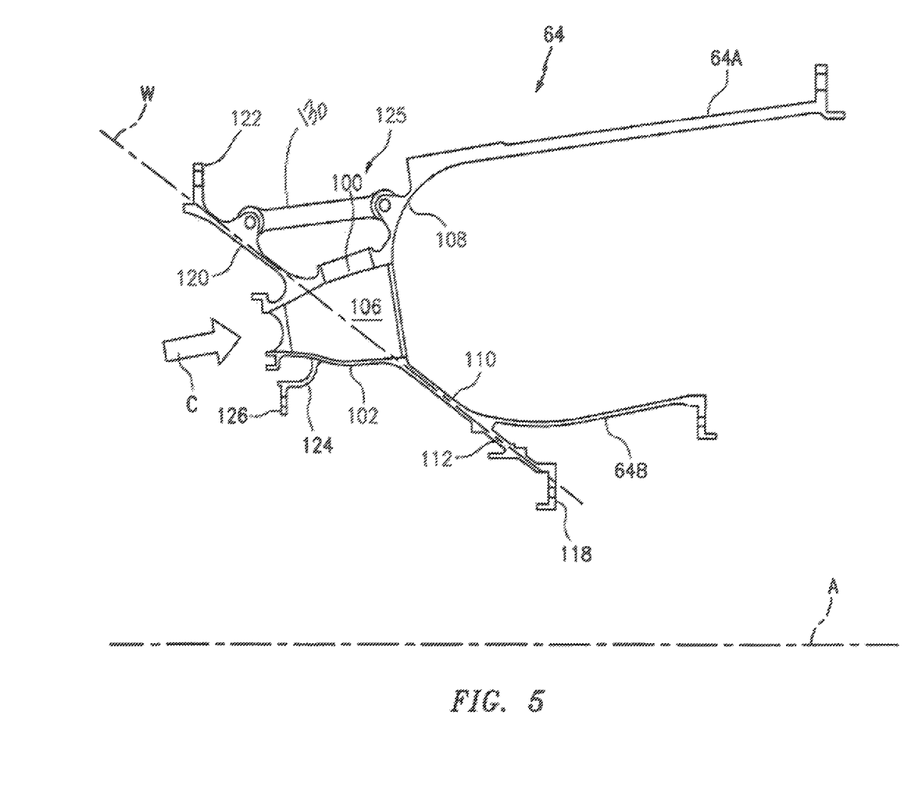
FIG. 5 is an longitudinal schematic sectional view of a hybrid diffuser case according to another non-limiting embodiment.
Figure 6:
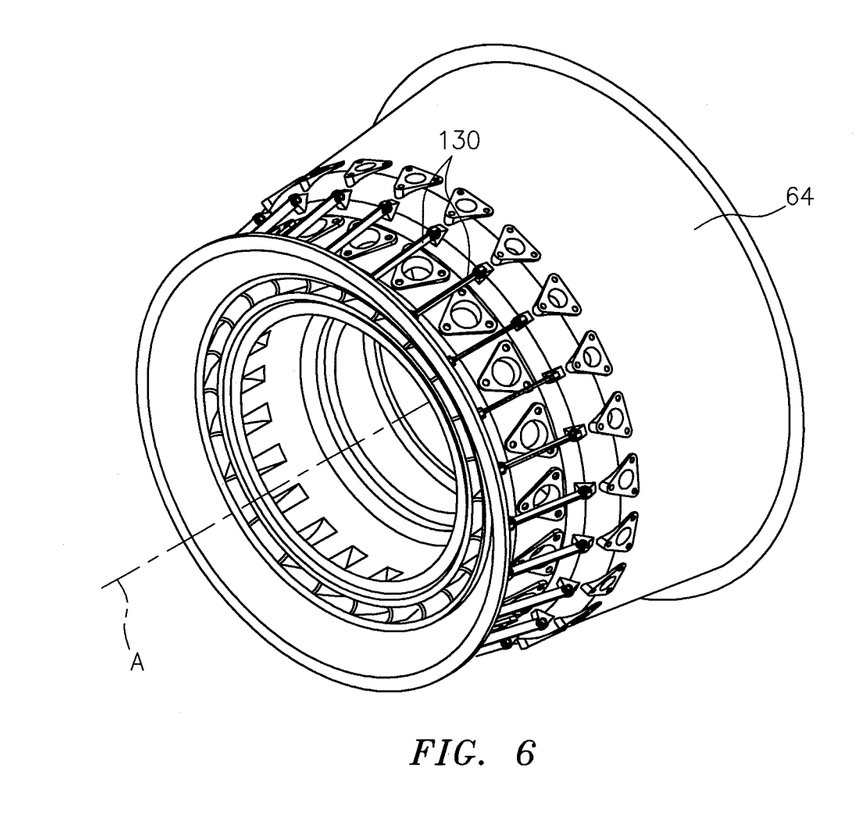
FIG. 6 is a schematic perspective view of the hybrid diffuser case of FIG. 5 illustrating stiffeners according to one non-limiting embodiment.

With reference to FIG. 5, in another disclosed non-limiting embodiment, a multiple of stiffeners 130 extends between the fastener flange 122 and the outer diffuser case wall 64A to essentially form a squirrel cage (see FIG. 6). The stiffeners 130 facilitate tailoring of the local stiffness with minimal weight increase. The stiffeners 130 may be, for example, ribs, tie-rods, linkage bars, a monolithic web-like structure or other axially extending members that may be manufactured of a material (e.g., titanium) similar or different to the hybrid diffuser case 64. The moment of inertia of these stiffeners 130 may be optimized depending on the types and direction of these loads relative to the engine case structure.

The hybrid diffuser case 64 beneficially provides a significant cost reduction compared to a conventional Forged/Cast structures and a significant weight reduction compared to both cast and wrought structures.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A hybrid diffuser case for a gas turbine engine, comprising:
    an outer diffuser case wall that extends downstream from an annular outer pre-diffuser case shroud;
    an inner diffuser case wall that extends downstream from an annular inner pre-diffuser case shroud;
    a plurality of struts that extend between the annular outer pre-diffuser case shroud and the annular inner pre-diffuser case shroud;
    a compressor case interface that extends from the annular outer pre-diffuser case shroud, wherein the compressor case interface terminates with compressor interface fastener flange that extends radially therefrom, and the compressor interface fastener flange extends around and is perpendicular to a central longitudinal engine axis; and
    a plurality of stiffeners that extend between the compressor interface fastener flange and the outer diffuser case wall.

2. The hybrid diffuser case as recited in claim 1, further comprising an outer arcuate interface wall between the outer diffuser case wall and the annular outer pre-diffuser case shroud.

3. The hybrid diffuser case as recited in claim 1, further comprising an arcuate interface wall between the inner diffuser case wall and the annular inner pre-diffuser case shroud.

4. The hybrid diffuser case as recited in claim 3, further comprising a bearing support that extends from an inner diffuser case skirt.

5. The hybrid diffuser case as recited in claim 4, wherein the bearing support terminates with a bearing support fastener flange that extends radially therefrom, and the bearing support a fastener flange extends around and is perpendicular to the central longitudinal engine axis.

6. The hybrid diffuser case as recited in claim 4, wherein the bearing support and the compressor case interface are located along a common axis.

7. The hybrid diffuser case as recited in claim 1, further comprising an inboard interface wall that extends from an annular inner diffuser case skirt.

8. The hybrid diffuser case as recited in claim 7, wherein the inboard interface wall terminates with an inboard interface wall fastener flange that extends radially therefrom, the inboard interface wall fastener flange extends around and is perpendicular to the central longitudinal engine axis.

9. A hybrid diffuser case for a gas turbine engine, comprising:
    an outer diffuser case wall that extends downstream from an annular outer pre-diffuser case shroud;
    an inner diffuser case wall that extends downstream from an annular inner pre-diffuser case shroud;
    a plurality of struts that extend between the annular outer pre-diffuser case shroud and the annular inner pre-diffuser case shroud;
    a compressor case interface that extends from the annular outer pre-diffuser case shroud, wherein the compressor case interface terminates with a compressor interface fastener flange that extends radially therefrom, the compressor interface fastener flange extends around and is perpendicular to a central longitudinal engine axis;
    a bearing support that extends from the inner diffuser case wall; and a plurality of stiffeners that extend between the compressor interface fastener flange and the outer diffuser case wall.

10. The hybrid diffuser case as recited in claim 9, further comprising an inner diffuser case skirt between the inner diffuser case wall and the annular inner pre-diffuser case shroud, the bearing support extends from the inner diffuser case skirt.

11. The hybrid diffuser case as recited in claim 10, wherein the bearing support terminates with a bearing support fastener flange that extends radially therefrom, the bearing support fastener flange extends around and is perpendicular to the central longitudinal engine axis.

12. The hybrid diffuser case as recited in claim 9, wherein the bearing support and the compressor case interface are located along a common axis.

13. The hybrid diffuser case as recited in claim 9, further comprising an outer arcuate interface wall between the outer diffuser case wall and the annular outer pre-diffuser case shroud, wherein the compressor case interface extends from the annular outer pre-diffuser case shroud.

\* \* \* \* \*